United States Patent [19]
Allen et al.

[11] Patent Number: 4,683,247
[45] Date of Patent: Jul. 28, 1987

[54] FOAMABLE THERMOPLASTIC COMPOSITIONS, FOAMED ARTICLES AND FOAMING METHOD BASED ON PRE-COMPOUNDED NUCLEATING AGENT-RESIN CONCENTRATE

[75] Inventors: Richard B. Allen, Dalton, Mass.; Roger W. Avakian, Brasschaat, Belgium

[73] Assignee: General Electric Company, Pittsfield, Mass.

[21] Appl. No.: 687,577

[22] Filed: Dec. 28, 1984

[51] Int. Cl.$^4$ .................................................. C08J 9/12
[52] U.S. Cl. .................................... 521/91; 264/45.5; 264/54; 521/79; 521/81; 521/92; 521/95; 521/134; 521/138; 521/139
[58] Field of Search ............... 521/180, 182, 139, 91, 521/92

[56] References Cited

U.S. PATENT DOCUMENTS

| | | | |
|---|---|---|---|
| 3,781,233 | 12/1973 | Muller et al. | 260/2.5 R |
| 4,097,425 | 6/1978 | Niznik | 521/180 |
| 4,174,432 | 11/1979 | Niznik | 521/134 |
| 4,243,575 | 1/1981 | Myers et al. | 521/180 |
| 4,278,769 | 7/1981 | Gebauer et al. | 521/182 |
| 4,280,005 | 7/1981 | Fox | 521/182 |
| 4,288,561 | 9/1981 | Craft et al. | 521/182 |
| 4,351,911 | 6/1978 | Fox | 521/138 |
| 4,543,368 | 9/1985 | Smearing et al. | 521/180 |
| 4,544,677 | 10/1985 | Allen et al. | 521/180 |

Primary Examiner—Morton Foelak
Attorney, Agent, or Firm—Richard J. Traverso; William F. Mufatti; Edward K. Welch, II

[57] ABSTRACT

Foamable thermoplastic compositions are described which are based on pre-compounded concentrated blends of an inorganic non-fibrous particulate foaming agent and a carrier polymer. The foamable thermoplastic polymer is selected from among aromatic polycarbonates alone or with acrylonitrile-butadiene-styrene copolymers polyesters, poly(ester-carbonates), and polyetherimides. The foaming agent may optionally be added as part of the concentrate.

17 Claims, 8 Drawing Figures

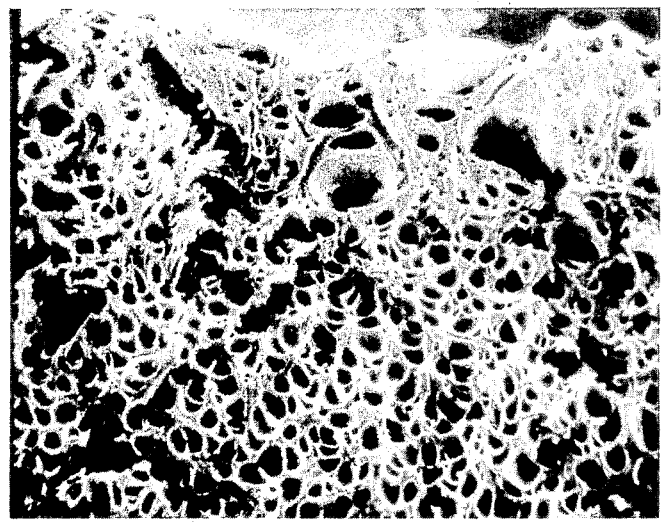
FIG. IE
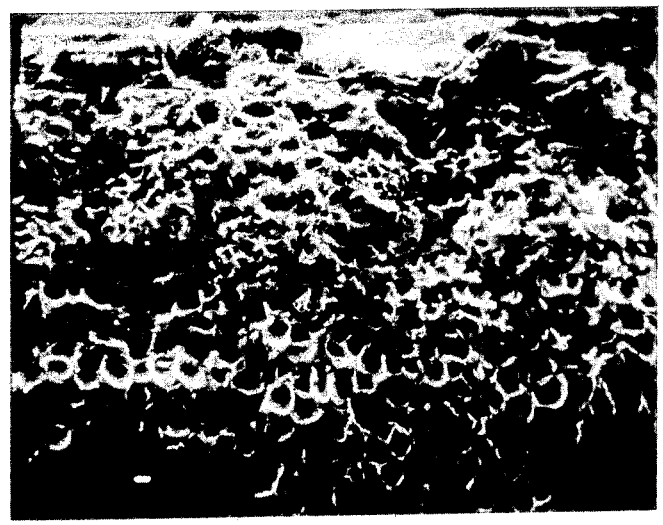
FIG. IF

FOAMABLE THERMOPLASTIC COMPOSITIONS, FOAMED ARTICLES AND FOAMING METHOD BASED ON PRE-COMPOUNDED NUCLEATING AGENT-RESIN CONCENTRATE

BACKGROUND OF THE INVENTION

High molecular weight aromatic polycarbonates and blends thereof with linear polyesters are known, and these can include finely divided particulate fillers having a low aspect ratio, such as silica, and polymeric particles, see, for instance, commonly assigned U.S. patent applications Ser. Nos. 553,172, now abandoned, 553,173, now U.S. Pat. No. 4,536,542 and 553,175, filed Nov. 18, 1983, now abandoned, Richard B. Allen. It is also known that foaming agents may be added to thermoplastics to produce a foamable material, as disclosed in U.S. Pat. Nos. 3,781,233, 4,097,421, 4,097,425, 4,280,005, and 4,351,911. These thermoplastics include polyesters and acrylonitrile-butadiene-styrene copolymers.

A difficulty which has been encountered is that when a foaming agent is added directly to a polyester, highly irregular foaming occurs which results in an inferior product containing voids and sink marks. A way to overcome this problem as disclosed in U.S. Pat. Nos. 4,280,005 and 4,351,911 is to add the foaming agent to a polyester containing a filler such as a fibrous glass, minerals or mixtures thereof in an amount of at least 5 percent.

Another difficulty, this time associated with polycarbonates, is that when a foaming agent is added, the material will not form a foam when injected into a cavity. Instead, the polymer collects as solid masses in the mold. Glass fibers can be added and these will to some extent alleviate the problem by aiding in the formation of gas bubbles that ultimately form cells, thus causing foaming. An entirely uniform, void-free structure is not produced, however, and the impact strength, including low temperature impact strength, of the molded article is adversely affected, which restricts the usefulnes of the composition in the range of foamed articles that can be produced.

The discovery has previously been made that structural foams comprising aromatic polycarbonate resins and related resins can be nucleated without the presence of glass fibers to yield foams that are superior in impact strength. This discovery is described in U.S. application Ser. No. 598,801, filed Apr. 10, 1984, now U.S. Pat. No. 4,544,677 Richard B. Allen and Roger W Avakian. The nucleating agent is an inorganic non-fibrous, particulate material, e.g., crystalline silica, alone or together with a particulate organic polymer, e.g., acrylate copolymer or polytetrafluoroethylene.

SUMMARY OF THE INVENTION

The discovery has now been made that foamable thermoplastic compositions can be prepared from admixtures of a thermoplastic organic polymer, foaming agent and nucleating agent, in which the nucleating agent, alone or optionally in combination with the foaming agent, is added in the form of a pre-extruded blend with an amount of the same or a different thermoplastic organic polymer.

Briefly described, the invention in one of its aspects comprises a foamable thermoplastic composition comprising (a) a thermoplastic polymer selected from the group consisting of aromatic polycarbonates, poly(ester-carbonates), polyesters, polyetherimides and mixtures of an acrylonitrile-butadiene-styrene copolymer with an aromatic polycarbonate;

(b) a pre-extruded blend of (i) a carrier polymer which may be the same as or different than (a), and (ii) an inorganic non-fibrous particulate foam nucleating agent; and (c) a minor, effective amount of a foaming agent, the amounts of (b)(ii) and (c) being sufficient to provide a rigid, substantially uniform cellular core within a solid integral skin.

Another facet of the invention is a method of preparing a foamed thermoplastic composition comprising providing a foamable thermoplastic composition as described above, and heating the composition in a confined space above a temperature at which polymer components (a) and (b)(i) soften and foaming agent (c) decomposes to release a gas, until formation of a rigid, substantially uniform cellular core within a solid integral skin is complete.

Still another facet of the invention comprises articles of manufacture formed from the above compositions.

The pre-extruded blend of components (b)(i) and (b)(ii), which may include (c) if desired, may also be referred to as a "concentrate" in the sense that the blend is more enriched in the amount of nucleating agent, or nucleating and foaming agents, than the amount of these same materials in the overall composition. For instance, in the typical case the pre-extruded blend, or concentrate, will contain from 5 to 15 times more nucleating agent or foaming agent per 100 parts of resin than present in the total composition. This differs from the procedure described in Ser. No. 598,801, in which a dry blend is prepared of the nucleating agent and the entire amount of resin, all of which is thereafter compounded by extrusion. Because the compounded material must usually be extruded again, prior to molding, in order to melt it and to cause decomposition of the blowing or foaming agent, the resin is subjected to high temperatures a second time, which may result in some decomposition and the formation of color bodies, usually manifested by a yellowish coloration in the foamed product, which is especially undesirable in the case of heat-sensitive polymers such as aromatic polycarbonates that are normally clear.

In the present invention, on the other hand, the composition is formulated such that only a portion, and not all of the main polymer, component (a), is compounded by extrusion with the nucleating or foaming agent, the rest being saved for extrusion only later, during the molding cycle. Indeed, the nucleating agent can even be pre-extruded with a different polymer, such as one which is more thermally stable or the same polymer but with a lower molecular weight such that lower extrusion temperatures can be used. Because of this less demanding thermal history, the resin or resins exhibits much less deterioration and the molded product has not undergone much yellowing, if any at all.

The problem of yellowing is especially acute in the case of foamable aromatic polycarbonate compositions. Because these polymers are normally inherently non-colored, any appreciable tendency to undergo yellowing will be noticeable to the human eye.

As is shown in the examples below, the addition of the nucleating agent to the composition in the form of a pre-extruded concentrate markedly reduces the tendency toward yellowing in the use of an aromatic polycarbonate resin composition. It is also seen that the use of the concentrate facilitates molding and results in the formation of a more uniform cell structure in the case of polyetherimide- and polyester- containing compositions.

DESCRIPTION OF THE DRAWINGS

FIGS. 1A, 1B, 1C, 1D, 1E and 1F are SEM (Scanning Electron Microscopy) photographs of sectional samples of the compositions described in Examples 1-4 (including comparisons A and B), under 50 times magnification.

DETAILED DESCRIPTION OF THE INVENTION

Figure 1A:
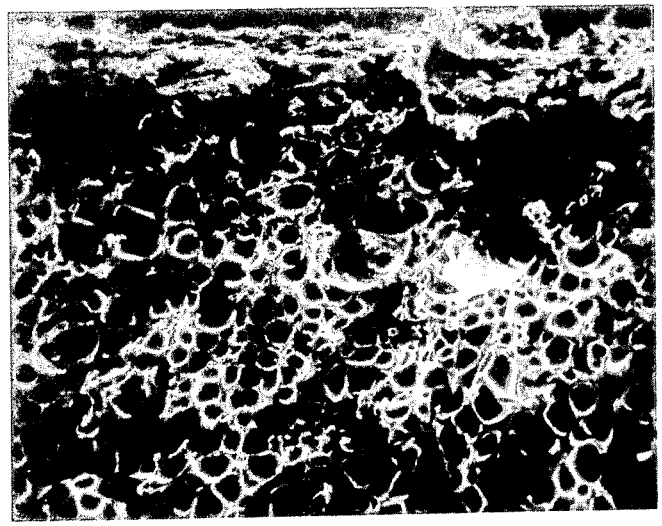
Figure 1B:
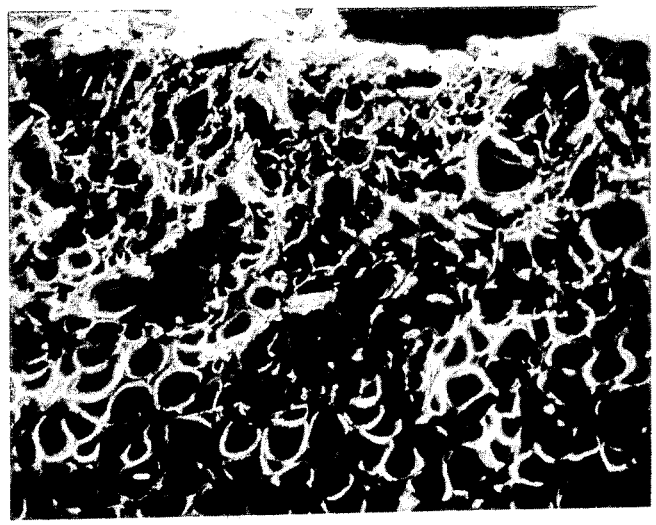
Figure 1C:
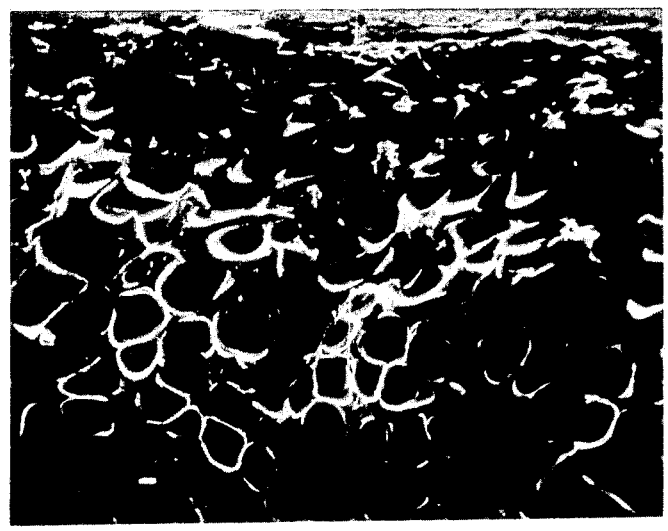
Figure 1D:
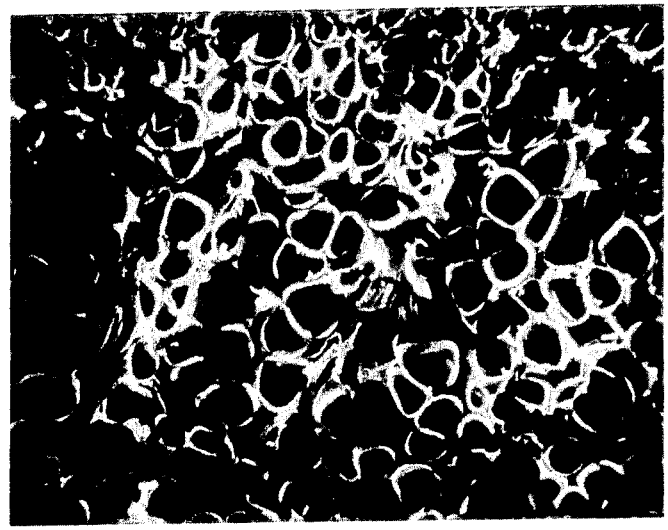

As mentioned, the invention is contemplated for practice with use of certain specified thermoplastic organic polymers as component (a).

Component (a) will preferably comprise an aromatic polycarbonate resin, which can be made by those skilled in the art, obtained from a variety of commercial sources, or prepared in the known manner by reacting a dihydric phenol with a carbonate precursor, such as phosgene, a haloformate or a carbonate ester. Typically, they will have recurring structural units of the formula:

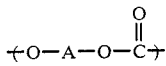

wherein A is a divalent aromatic radical of the dihydric phenol employed in the polymer producing reaction. Preferably, the aromatic carbonate polymers have an intrinsic viscosity ranging from 0.30 to 1.0 dl./g (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4-dihydroxydiphenyl ether, bis(2-hydroxyphenyl)methane, mixtures thereof and the like. The preferred aromatic carbonate polymer for component (a) is a homopolymer derived from 2,2-bis(4-hydroxyphenyl)propane(bisphenol-A).

Poly(ester-carbonates) suitable for use as component (a) are known and can be obtained commercially. Generally, they are copolyesters comprising recurring carbonate groups:

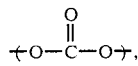

carboxylate groups:

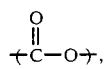

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture thereof, and phosgene. The molar proportions of dihydroxy diaryl units to benzenedicarboxylate units to carbonate units can range from 1:0.30–0.80:0.70–0.20 and the molar range of terephthalate units to isophthalate units can range from 9:1 to 2:8 in this preferred family of resins.

Also suitable for use as component (a) are polyesters, especially polyesters derived from an aliphatic, aliphatic ether or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

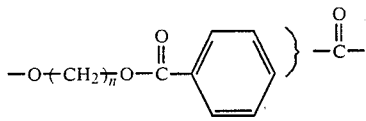

wherein n is an integer of from 2 to 4. The most preferred polyesters are poly(ethylene terephthalate) and poly(1,4-butylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539, incorporated herein by reference.

The polyesters which are derived from a cycloaliphatic diol and an aromatic and/or cycloaliphatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

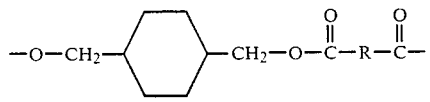

wherein the cyclohexane ring is selected from the cis and trans isomers thereof and R represents an aryl or cycloaliphatic radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1.4- or 1.5-naphthalenedicarboxylic acid. Also contemplated are cycloaliphatic diacids, such as cyclohexane dicarboxylic acid. The preferred dicarboxylic acids are terephthalic acid or a mixture of terephthalic and isophthalic acids.

Another preferred polyester may be derived from the reaction of either the cis- or trans-isomer (or a mixture thereof) of 1.4-cyclohexanedimethanol with a mixture of isophthalic and terephthalic acids. Such a polyester would have repeating units of the formula:

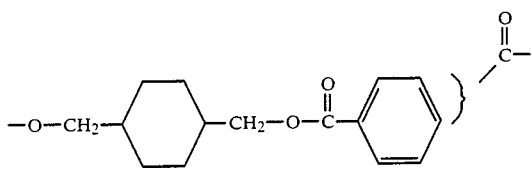

Still another preferred polyester is a copolyester derived from a cyclohexane dimethanol, an alkylene glycol and an aromatic dicarboxylic acid. These copolyesters are prepared by condensing either the cis- or trans-isomer (or mixture thereof) of, for example, 1,4-cyclohexane dimethanol and an alkylene glycol with an aromatic dicaboxylic acid so as to produce a copolyester having units of the following formulae:

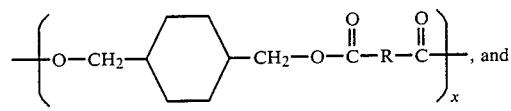, and

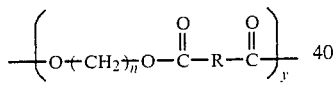

wherein the cyclohexane ring is selected from the cis and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

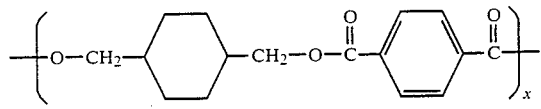

and of:

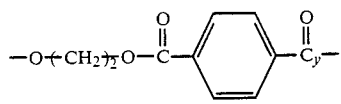

wherein x and y are as previously defined.

Also included within this invention are polyesters derived from aliphatic ether diols, for example, tetraethylene diol, and from diacids.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

Also possible for use as component (a) are polyetherimides, and more specifically those polymers which are formed by effecting reaction between aromatic bis(etheranhydrides) and organic diamines. In general, the polyethermides suitable for use herein consist of the following chemically combined units:

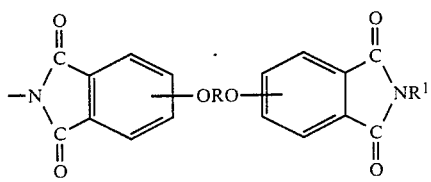

in which R is a member selected from the class consisting of (a) the following divalent organic radicals:

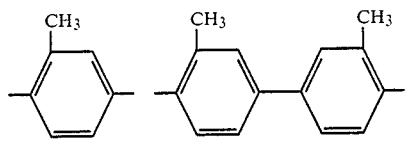

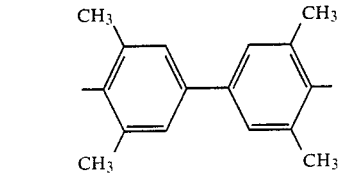

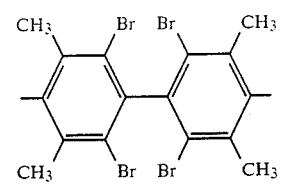

and

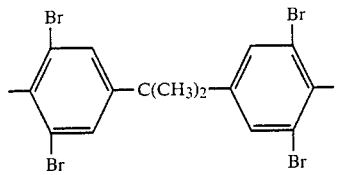

and (b) divalent organic radicals of the general formula

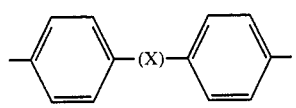

where X is a member selected from the class consisting of divalent radicals of the formulae —$C_yH_{2y}$—,

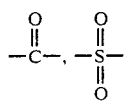

and —S—, where y is a whole number from 1 to 5, and the divalent bonds of the —O—R—O radical are equally situated on the phthalic anhydride end groups, for example, in the 3,3'-positions, or the 4,4'-positions, and R' is a divalent organic radical selected from the class consisting of (a) aromatic hydrocarbon radicals having from 6 to 20 carbon atoms and halogenated derivatives thereof, (b) alkylene radicals and cycloalkylene radicals having from 2 to 20 carbon atoms, $C_{2-8}$ alkylene terminated polyorganosiloxane, and (c) divalent radicals of the formula

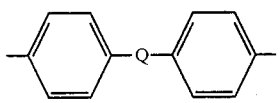

where Q is a member selected from the class consisting of —O—,

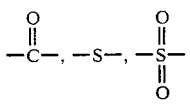

and —$C_xH_{2x}$—, and x is a whole number from 1 to 5 inclusive.

Especially preferred for the present purposes are polyetherimides formed by the reaction between a bisphenol dianhydride, such as 2,2-bis(4-(2,3-dicarboxyphenoxy)-phenyl)propane dianhydride or 2,2-bis(4-(3,4-dicarboxyphenoxy)-phenyl) propane dianhydride and an organic diamine such as 4,4-methylenedianiline or 4,4'-diaminodiphenyl ether.

Further details regarding the polyetherimide may be obtained in U.S. Pats. Nos. 3,847,867 and 3,875,116(Heath, et al.).

As mentioned, component(a) can also comprise an acrylonitrile-butadiene-styrene(ABS) copolymer. Typically, this polymer, when employed, is used in the present compositions in admixture with the aromatic polycarbonate resin. The ABS polymers are well known in the art and methods of preparation are described in the patent literature, for example, U.S. Pat. No. 2,550,349; U.S. Pat. No. 2,550,139; U.S. Pat. No. 2,698,313; U.S. Pat. No. 2,713,566; U.S. Pat. No. 2,820,773; U.S. Pat. No. 2,908,661; and U.K. No. 698,385, all of which are incorporated herein by reference.

The foaming agent (or agents, if more than one is used, which is permissible), component (c) of the present compositions, can be selected from chemicals containing decomposable groups such as azo, N-nitroso, carboxylate, carbonate, heterocyclic nitrogren-containing and sulfonyl hydrazide groups. Generally, they are solid materials that liberate gas(es) when heated by means of a chemical reaction or upon decomposition. Representative compounds include azodicarbonamide, dinitrosopentamethylene tetramethylene tetramine, p,p'-oxy-bis(benzenesulfonyl)-hydrazide, benzene-1,3-disulfonyl hydrazide, aso-bis-(isobutyro-nitrile), biuret and urea. The dihydrooxadiazinones of U.S. Pat. No. 4,097,425 are members of an especially preferred family of foaming agents. The foaming agent may be added to the polymer in several different ways which are known to those skilled in the art, for example, by adding the solid powder, liquid or gaseous agents directly to the resin in the extruder while the resin is in the molten state to obtain uniform dispersal of the agent in the molten plastic. The temperature and pressures to which the foamable composition of the invention are subjected to provide a foamed composition will vary within a wide range, depending upon the amount and type of foaming agent that is used. The preferred foaming agents are dinitrosopentamethylene tetramine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one and mixtures of any of them.

Optionally, as mentioned the foaming agent may be added as part of the pre-extruded concentrate together with components (b)(i) and (b)(ii). In such a case, pre-extrusion to form the concentrate is accomplished at temperatures below the decomposition temperature of the foaming agent. If such temperatures are not high enough to soften the carrier polymer, a lower molecular weight counterpart of the same polymer may be used as the carrier polymer, or another thermoplastic polymer with a lower softening point may be employed.

The carrier polymer, component (b)(i), may be the same polymer as utilized for component (a), or it may be any other polymer, including any of the above mentioned, which compatible with the particular polymer being employed as (a), at the desired loading level. In other words, if a different polymer is to be used as the carrier polymer, care should be taken to be sure it is compatible with the polymer of (a), and this will tend to be more important when the concentration of nucleating agent (and foaming agent, if also used in the concentrate) is relatively low and the amount of the carrier polymer is correspondingly higher. In general, all of the above mentioned polymers are compatible with one another over a wide range of amounts, and these are favored for use in the present invention for both components (a) and (b)(i).

Various inorganic, non-fibrous particulate compounds can be employed for use as the foam nucleating agent or agents, component (b)(ii), in accordance with this invention, the purpose of such agents being to provide a surface for bubble formation analogous to the use of "boiling chips" to moderate bubble formation and to prevent "bumping" in boiling liquids. Selection of particular nucleating agents by those skilled in the art is an easy matter. For instance, the compositions can be formulated and foam molded in standard injection molding machines into workpieces suitable for measuring cell structure and flow, and ultimately impact strength, which provides useful information on resistance to ductile impact.

Any siliceous or non-siliceous inorganic particulate material, alone, or together with an organic polymeric particulate material can be employed as component (b)(ii). By way of illustration, the inorganic material can be amorphous silica, precipitated silica, fumed silica or titanium dioxide, and the organic polymer can be particulate acrylate copolymers, for example, those described in Liu, U.S. Pat. No. 4,320,212, or dispersible polytetrafluoroethylene particles.

Preferred for use in the present invention are silicas. These are available in a variey of forms with suitable particle sizes, aspect ratios and surface polarities, For component (b)(ii) herein, only a synthetic type of silica will be used. These differ from silicas of the mineral type, which are mainly employed in the form of quartz and glass. Amorphous, that is, non-crystalline silicas, on the other hand, are typically used in generally small amounts, to achieve special effects. They are made by well known processes, such as one of the pyrogenic processes, i.e., the AEROSIL process in which silicon tetrachloride is mixed with hycrogen and oxygen at 1000° C. or higher, or the electric arc process in which quartz and coke are heated at 1500° C. or above and the SiO and CO which are formed thereby are further reacted with atmospheric oxygen. Wet processes are also useful to prepare silicas suitable for use herein, e.e., a precipitation process in which sodium water glass and sulfuric acid are stirred and silica precipitates, or a hydrothermal process, in which quartz is heated with lime under pressure at 180° C., and the calcium silicate is mixed with hydrochloric acid. In all cases, the silica is obtained in a highly dispersed, i.e., very finely divided form. They are not crystalline, but are amorphous, as determined by x-rays.

In especially preferred embodiments, the inorganic foam nucleating agent will carry a surface coating sufficient to render it hydrophobic. Hydrophobic surface treated particulate agents suitable for use herein are commercially available, for example, the material known as CabOSil N70-TS, from Cabot Corporation.

When preparing the present compositions, the nucleating agent, (b)(ii), can be used, for example, in amounts to provide a concentration in the final composition in the range from about 0.3 to about 80, preferably 8 to 15, parts by weight, based on the total composition weight. The concentration for the foaming agent, (c), can be, for example, from about to 1 about 50, preferably 3 to 10, parts by weight, based again on the total weight of the composition.

As regards the pre-extruded concentrate, the ratio of nucleating agent to carrier resin (and of foaming agent to carrier resin, if the foaming agent is added as part of the concentrate) can vary widely. Generally, however, the concentrate will comprise, for example, a weight ratio of nucleating agent to carrier resin (components (b)(ii) and (b)(i), respectively) in the range from about 1:5 to about 1:15, with similar amounts being applicable for the foaming agent.

When preparing the concentrate, it is preferred to form a dry mixture of the ingredients first, then pass the mixture through an extruder (single or twin screw) at a temperature at least sufficient to soften the carrier polymer and form a homogenous blend with the nucleating agent (or nucleating and foaming agents), then cool and pelletize the extrudate.

Examples of additional ingredients which may be included in the present composition are colorants, for examples, dyes and pigments; fillers, reinforcing agents; surfactants; modifiers to increase the flow of the molten resin, for example, waxes or fatty acid esters; lubricants; mole-release agents; stabilizers; antioxidants; impact strength improvers; flame retardants; and so forth.

The resulting blend of materials, comprising polymeric component (a), the concentrate of carrier polymer (b)(i) and nucleating agent (b)(ii) and foaming agent (c), together with any additional ingredients, may be processed into a shaped article by dry mixing the ingredients, extruding the mixture and injection molding the extrudate. Extrusion and molding temperatures will obviously vary depending on the particulate polymer employed.

The compositions of this invention may be used to form a wide variety of foam molded products and, in general, to form the same types of articles which heretofore have been produced using various foamable thermoplastic polymers.

The concentrate, composition and method which comprise this invention are further illustrated in the examples which follow. All amounts are in parts by weight (pbw) unless otherwise indicated.

EXAMPLES 1-4

The compositions shown in Table 1 were prepared using the compounding techniques indicated. In all cases, the concentrate was prepared beforehand by dry mixing the ingredients of the concentrate, extruding the mixture, typically, at 500° F., and cutting the extrudate into pellets which were used to prepare the compositions.

TABLE 1

COMPARISON OF CONCENTRATE VS. NON-CONCENTRATE IN POLYCARBONATES

| Example | Mold Machine Feedstock[d] | Amt. pbw | Compounding Technique | Drop Ball Impact Str., ft. lbs. 25° C. | Drop Ball Impact Str., ft. lbs. −40° C. |
|---|---|---|---|---|---|
| A* | Poly(bisphenol-A carbonate)resin | 100 | | >90 | 22.6 |
| 1 | Poly(bisphenol-A carbonate)resin | 100 | Extrusion; Single/Double Screw | 80.6 | 23.9 |
| | Concentrate(20% weight of silica[a] in poly(bisphenol-A carbonate)resin) | 2.8 | | | |
| 2 | Poly(bisphenol-A carbonate)resin | 100 | Dry Mixing, room temp. | >90 | 26 |
| | Concentrate(17% silica[a] in poly bisphenol-A carbonate)resin) | 3 | | | |
| 3 | Poly(bisphenol-A carbonate)resin | 95 | Dry Mixing, room temp. | 90 | 29.1 |
| | Concentrate (consisting of 80 parts poly | 5 | | | |

TABLE 1-continued
COMPARISON OF CONCENTRATE VS. NON-CONCENTRATE IN POLYCARBONATES

| Example | Mold Machine Feedstock[d] | Amt. pbw | Compounding Technique | Drop Ball Impact Str., ft. lbs. 25° C. | −40° C. |
|---|---|---|---|---|---|
| | (bisphenol-A carbonate)resin, 15 parts silica[a] and 5 parts 5-phenyl-3,6-dihydro-1,3,4-oxadiazin-2-one blowing agent) | | | | |
| B* | Poly(bisphenol-A carbonate)resin | 100 | Extrusion, Single/Double screw ca 525° F. | >90 | 44.8 |
| | Silica[a] | 0.5 | | | |
| | Polycarbonate/ polysiloxane copolymer[b] | 5 | | | |
| 4 | Poly(bisphenol-A carbonate)resin | 95 | Dry Mixing room temp. | 85 | 37 |
| | Polycarbonate/ polysiloxane copolymer[b] | 5 | | | |
| | Concentrate (14.1% by weight of silica[a] in poly(bisphenol-A carbonate)resin) | 3.6 | | | |

*Comparison, not in accordance with this invention
[a]CABOT, CABOSIL N 70-TS, hydrophobic fumed silica
>means greater than
[b]LR 3220, General Electric Co.
[d]feedstocks for Examples A*, B*, 1, 2 and 4 contains 5 parts by weight (pbw) blowing agent composition (95 pbw polycarbonate/5 pbw 5-phenyl-3,6-dihydro-1,3,4-oxydiazin-2-one)

As can be seen from the Table, the drop ball impact strength of the molded composition were nearly the same regardless of the compounding technique and whether or not a concentrate of the nucleating agent or foaming agent was used. The cross-sectional physical appearance under 50 times magnification was also about the same, as can be seen from FIGS. 1A–1F. However, the compositions in which a concentrate was employed were less yellow, as manifested by, for example, a lower yellowness index. This can be beneficial in many commercial applications by eliminating the need for painting to hide the yellowish surface appearance.

EXAMPLE 5

This example illustrates an aromatic polycarbonate/acrylonitrile-butadiene-styrene composition prepared using a nucleating agent concentrate in accordance with this invention. A comparison composition was also included. The compositions and impact strengths are reported in Table 2. The processing conditions are described below.

The concentrate was prepared by dry mixing the ingredients, extruding the mixture on a one inch Haake single-screw extruder at an L/D or 25 at about 490° F., and chopping the cooled extrudate into pellets.

The molded composition was prepared as follows:
Extrusion Conditions: One inch single screw Haake Extruder, vented, with L/D ratio of 25; all zones set at about 290° C., RPM 70, melt temperature 255° C.
Molding Conditions: 10 1/2 ounce Reed molding press, utilizing 80% of shot capacity; molded plaques (5½"×11"×¼"); molding temperature of 465° F., 150° F. mold temp.

TABLE 2

| Example | Mold Machine Feedstock | Amt. pbw | Compounding Technique | Drop Dart Impact Str., ft., lb., at 25° C. |
|---|---|---|---|---|
| 5 | Poly(bisphenol-A carbonate) | 70 | Extruded | 23 |
| | ABS | 30 | | |
| | Stabilizers | 0.65 | | |
| | Concentrate (14% by weight of silica[a] in poly (1,4-butylene terephthalate) | 3.8 5-phenyltetrazole | | |
| C* | Poly(bisphenol-A carbonate | 70 | Extruded | 10.1 |
| | ABS | 30 | | |
| | Stabilizers | 0.65 5-phenyltetrazole | | |

*Comparison, not in accordance with this invention
[a]Same as in Table 1,
[c]Feedstocks for Examples 5 and C* include 5 parts by weight blowing agent composition (95 pbw polycarbonate/5 pbw 5-phenyl-3,6-dihydro-1,3,4-oxydiazin-2-one)

As shown, the use of the nucleating agent concentrate considerably improves the drop dart impact strength of the composition.

EXAMPLE 6

This example illustrates a polyetherimide composition prepared using a nucleating agent concentrate in accordance with this invention.

The composition contained, in addition to the polyetherimide, 0.25% by weight of 5-phenyl-3,6-dihydro-1,3,4-oxadiazin-z-one foaming agent and 0.5% by weight of hydrophobic foamed silica (Cabot's CABO-SIL N 70-TS). The silica was added as a 10% by weight concentrate in the polyetherimide. The concentrate and the composition were prepared using the same conditions described for their respective counterparts in Example 5. They were molded however at 625° F.

For comparison purposes, the corresponding composition without the silica was also prepared under the same conditions (but no concentrate was involved).

Figure 2A:
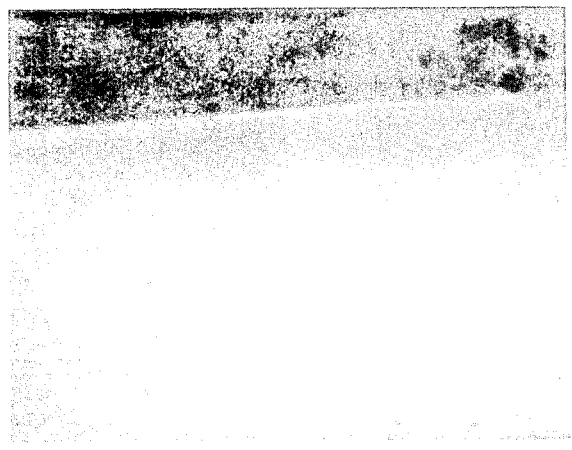
FIGS. 2A and 2B are SEM photographs of samples of the compositions of Example 6, again 50 times magnified.
Figure 2B:
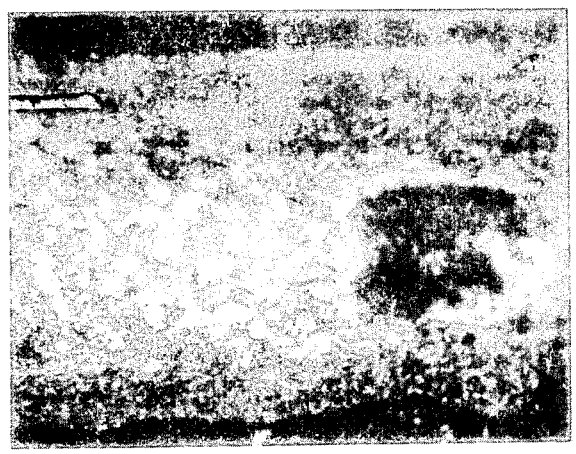

The effect of using the silica concentrate in the polyetherimide was to provide a much more uniform cell structure, as can be readily seen from FIGS. 2A (in accordance with the invention) and 2B (the comparison).

EXAMPLE 7

This example illustrate a polyester composition prepared using a nucleating agent concentrate in accordance with this invention.

A concentrate of 10% by weight of hydrophobic fumed silica (Cabot's CABOSIL N 70-TS) in poly(1,4-butylene terephthalate) resin was first prepared by mixing the ingredients in a mechanical blender, extruding the mixture at a temperature of 430° F. and pelletizing the extrudate. The pellets were then used to prepare a composition comprising 99.25 parts by weight of poly(1,4-butylene terphthalate), 0.25 parts by weight of 5-phenyltetrazole foaming agent, and 0.5 parts by weight of the silica. The composition was foamed into molded test pieces by mixing the ingredients at room temperature, extruding the mixture at 430° F. and injection molding at 430° F. (120° F. mold temp.).

For comparison, a corresponding composition comprising poly(1,4-butylene terephthalate)resin and 5-phenyltetrazole foaming agent in the same relative amounts as above, but with no silica, was also prepared.

The composition in accordance with the invention after molding exhibited a drop dart impact strength of 5.8 ft.lbs. as tested at 25° C. The comparison composition would not foam mold at all.

All of the patents and/or publications mentioned above are incorporated herein by reference.

Other modifications and variations of the invention are possible. It should be understood, therefore, that changes may be made in the particular embodiments shown without departing from the scope of the invention as defined in the appended claims.

We claim:

1. A foamable thermoplastic feedstock, comprising
(a) a thermoplastic matrix polymer selected from the group consisting of aromatic polycarbonates, poly (ester-carbonates), polyesters, polyetherimides and mixtures of an aromatic polycarbonate and an acrylonitrile-butadiene-styrene copolymer;
(b) a pre-extruded blend of (i) a carrier polymer which may be the same as or different than (a) and (b)(ii) an inorganic non-fibrous particulate foam nucleating agent; and
(c) a minor, effective amount of a foaming agent, the amounts of (b)(ii) and (c) being sufficient to provide a rigid, substantially uniform cellular core within a solid integral skin.

2. A composition according to claim 1, in which component (a) is a mixture of a poly(bisphenol-A carbonate) and an acrylonitrile-butadiene-styrene copolymer.

3. A composition according to claim 1, in which the foam nucleating agent, component (b)(ii), is selected from the group consisting of amorphous silica, precipitated silica, fumed silica and titanium dioxide, alone or together with an organic polymeric particulate material.

4. A composition according to claim 3, in which the particulate organic polymeric material is selected from acrylate copolymers and polytetrafluoroethylenes.

5. A composition according the claim 1, in which the foaming agent, component(c), comprises a chemical compound which can be decomposed to release a gas harmless to polymeric component(a).

6. A composition according to claim 1, in which component (c) comprises a nitroso compound, a semicarbaxide compound, a tetrazole compound, an oxalate compound, a triazine compound, a dihydrooxadiazinone compound, or a mixture of any of the foregoing.

7. A composition according to claim 6, in which component (c) is selected from the group consisting of dinitrosopentamethylene tetramine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one and mixtures of any of the foregoing.

8. A composition according to claim 1, wherein component (b)(ii) is present in an amount from 0.3 about to about 80 parts by weight based on 100 parts by weight of the total composition.

9. A composition according to claim 1, wherein component (c) is present in an amount from about 1 to about 50 parts by weight based on 100 parts by weight of the total composition.

10. A composition according to claim 1, in which component (b) comprises the carrier polymer, (i), and the nucleating agent, (ii), in a weight ratio from about 5:1 to about 15:1, respectively.

11. A foamable thermoplastic feedstock, comprising:
a. an aromatic polycarbonate matrix polymer;
b. a substantially uniform blend of
 (i) a carrier polymer selected from the group consisting of aromatic polycarbonates, polyester and poly(ester-carbonates) and
 (ii) an inorganic, non-fibrous particulate foam nucleating agent; and
c. an effective amount of foaming agent; the amounts of nucleating agent and said foaming agent being sufficient to provide a rigid, substantially uniform cellular core within a solid integral skin.

12. A composition according to claim 11, in which the aromatic polycarbonate is poly(bisphenol-A carbonate).

13. A foamable thermoplastic feedstock, comprising
a. a poly(alkylene terephthalate) matrix polymer;
b. substantilly uniform blend of
 (i) a carrier polymer selected from the group consisting of polycarbonates, poly(ester-carbonates), and polyesters; and
 (ii) an inorganic, non-fiberous particulate foam nucleating agent; and
c. an effective amount of foaming agent; the amounts of said nucleating agent and said foaming agent being sufficient to provide a rigid, substantially uniform cellular core within a solid integral skin.

14. A composition according to claim 13, in which the polyalkylene terephthalate is poly(1,4-butylene terephthalate).

15. A composition according to claim 13, in which the polyalkylene terephthalate is poly(ethylene terephthalate).

16. A foamable thermoplastic feedstock, comprising
   a. a polyetherimide matrix polymer;
   b. a substantially uniform blend of
      (i) a carrier polymer selected from the group consisting of polyetherimides, aromatic polycarbonates, poly(ester-carbonates) and polyesters, and
      (ii) an inorganic, non-fibrous particulate foam nucleating agent; and
   c. an effective amount of foaming agent; the amounts of said nucleating agent and said foaming agent being sufficient to provide a rigid, substantially uniform cellular core within a solid integral skin.

17. A foamable feedstock composition comprising
   a. a major proportion of solid pellets comprising a thermoplastic polymer selected from the group consisting of aromatic polycaronate, poly(ester-carbonate), polyesters, polyetherimides and a mixture of aromatic polycarbonate and butadiene-acrylonitrile-styrene copolymer;
   b. a minor proportion of solid pellets consisting of a substantially uniform blend of an inorganic, non-fiberous particulate foam nucleating agent and a carrier thermoplastic polymer in a mole ratio greater than 1:15, said carrier thermoplastic polymer being selected from a group consisting of aromatic polycarbonates, polyesters, poly(ester-carbonates) and polyetherimides;
   c. an effective amount of a foaming agent;
the amounts of a nucleating agent and foaming agent being sufficient to provide a rigid, substantially uniform cellular core within a solid integral skin, said pellets being of a size suitable for feeding into a foamable molding machine.

* * * * *